United States Patent [19]
Nylund et al.

[11] Patent Number: 6,008,284
[45] Date of Patent: *Dec. 28, 1999

[54] FAST CURING ALKOXY-FUNCTIONAL RTV COMPOSITIONS

[75] Inventors: Kimberly Kay Nylund; Richard Alan Palmer, both of Midland, Mich.

[73] Assignee: Dow Corning Corporation, Midland, Mich.

[*] Notice: This patent is subject to a terminal disclaimer.

[21] Appl. No.: 08/997,523

[22] Filed: Dec. 23, 1997

[51] Int. Cl.$^6$ ...................................................... C08K 3/26
[52] U.S. Cl. ........................... 524/425; 528/17; 524/788; 524/588
[58] Field of Search ............................... 528/17; 524/588, 524/425, 788

[56] References Cited

U.S. PATENT DOCUMENTS

| | | | |
|---|---|---|---|
| 4,387,177 | 6/1983 | Mine et al. | 524/425 |
| 4,525,565 | 6/1985 | Laisney et al. | 528/17 |
| 4,525,566 | 6/1985 | Homan et al. | 528/17 |
| 4,530,882 | 7/1985 | Homan et al. | 428/452 |
| 4,585,705 | 4/1986 | Broderick et al. | 428/447 |
| 4,681,908 | 7/1987 | Broderick et al. | 524/268 |
| 4,743,474 | 5/1988 | Homan | 427/387 |
| 4,871,827 | 10/1989 | Klosowski et al. | 528/17 |
| 4,888,404 | 12/1989 | Klosowski et al. | 528/15 |
| 5,286,766 | 2/1994 | Arai et al. | 523/213 |
| 5,733,996 | 3/1998 | Debuyl et al. | 528/17 |
| 5,840,794 | 11/1998 | Palmer | 524/425 |

FOREIGN PATENT DOCUMENTS

| | | |
|---|---|---|
| 621150 | 6/1992 | Australia . |
| 4210349 | 10/1993 | Germany . |

OTHER PUBLICATIONS

DC4609 Alan Lee Freiberg and Richard Alan Palmer, Method of Forming a Seal in a Confined Configuration With an Alkoxy–Functional RTV Composition Dec. 23, 1997.

*Primary Examiner*—Melvyn I. Marquis
*Assistant Examiner*—Mark W. Milstead
*Attorney, Agent, or Firm*—Pat M. Scaduto

[57] ABSTRACT

A fast curing alkoxy-functional room temperature vulcanizing (RTV) composition which is curable in the presence of moisture comprising polymers comprising on average at least 1.2 alkoxysilyl chain terminations per molecule, a tetraalkoxytitanium compound, a filler, and an alkoxysilane, each component being added in amounts to satisfy defined molar ratios.

23 Claims, No Drawings

FAST CURING ALKOXY-FUNCTIONAL RTV COMPOSITIONS

BACKGROUND OF THE INVENTION

1. Field of the Invention

This invention is an alkoxy-functional room temperature vulcanizing (RTV) composition, curable in the presence of moisture, comprising polymers containing on average at least 1.2 alkoxysilyl chain terminations per molecule, a tetraalkoxytitanium compound, a filler, and an alkoxysilane. The addition of these components in amounts to satisfy defined molar ratios provide fast curing alkoxy-functional RTV compositions.

2. Background Information

Polyorganosiloxane compositions which cure to elastomeric materials at room temperature are well known. Such compositions can be obtained by mixing polydiorganosiloxanes having reactive groups, such as silanol groups, with silane crosslinking agents, for example, alkoxysilanes, acetoxysilanes, oximosilanes, or aminosilanes. Compositions comprising these ingredients can then be cured by exposure to atmospheric moisture at room temperature.

Moisture curable compositions are well known for their use as sealants. In certain applications, it is necessary to use a sealant which can cure quickly. Sealant compositions which cure quickly include silicone sealant compositions which evolve acetic acid, ketoximes, or amines as by-products during cure. These by-products have unpleasant odors and may corrode sensitive metals or plastics. The use of other compositions which would not have these properties would therefore be beneficial. One potential alternative to these compositions is an alkoxy-functional RTV composition which would liberate alcohol during cure. However, alkoxy-functional RTV compositions containing tetraalkoxytitanium compounds such as tetraisopropoxytitanium and tetra-n-butoxytitanium, are known to be slow to cure, seldom having tack-free-times (TFT) of less than 60 minutes. Therefore, these compositions are not suitable for applications requiring fast cure.

The present inventors have unexpectedly determined that fast curing alkoxy-functional RTV compositions may be prepared, however, when certain tetraalkoxytitanium compounds, for example tetra-tertiary-alkoxytitanium compounds, are added in amounts to satisfy defined molar ratios.

The objective of this invention is to prepare a fast curing alkoxy-functional RTV composition.

SUMMARY OF THE INVENTION

The present invention is a fast curing alkoxy-functional RTV composition which is curable in the presence of moisture comprising polymers comprising on average at least 1.2 alkoxysilyl chain terminations per molecule, a tetraalkoxytitanium compound, a filler, and an alkoxysilane, each component being added in amounts to satisfy defined molar ratios.

DETAILED DESCRIPTION OF THE INVENTION

This invention is a fast curing alkoxy-functional RTV composition, curable in the presence of moisture, comprising (A) polymers comprising on average at least 1.2 alkoxysilyl (chain terminations per molecule described by formula $$\text{—SiR}^1_x(\text{OR})_{3-x},\quad\quad (VII)$$

where each R is independently selected from the group consisting of methyl, ethyl, n-propyl, isopropyl, n-butyl, sec-butyl, and isobutyl, $R^1$ is selected from the group consisting of methyl and ethyl, and x is 0 or 1;

(B) a tetraalkoxytitanium compound described by average formula $$\text{Ti}(\text{OR}^2)_y(\text{OR}^3)_{4-y},\quad\quad (V)$$

where each $R^2$ is independently selected from the group consisting of tertiary alkyl radicals and 2,4-dimethyl-3-pentyl; each $R^3$ is an independently selected alkyl radical comprising from 1 to about 6 carbon atoms; and y is an average value of from 3 to 4;

(C) a filler having hydroxyl content derived from covalently bonded hydroxyl groups, adsorbed water, or both covalently bonded hydroxyl groups and adsorbed water; and (D) an alkoxysilane described by formula $$R^4_z\text{Si}(\text{OR}^5)_{4-z},\quad\quad (VI)$$

where each $R^4$ is independently selected from the group consisting of alkyl radicals comprising from 1 to about 12 carbon atoms and alkenyl radicals comprising from 1 to about 12 carbon atoms; each $R^5$ is independently selected from the group consisting of methyl and ethyl, and z is 1 or 2; with the proviso that components (A), (B), (C), and (D) are added in amounts such that a molar ratio (I) is at least 0.9 and a molar ratio (II) is at least 0.15, where $$\text{molar ratio (I)} = \frac{\text{moles Component }(B) + \text{moles Component }(D)}{\text{moles hydroxyl in Component }(C)}$$

and $$\text{molar ratio (II)} = \frac{\text{moles Component }(B)}{\text{moles Component }(D) + \text{moles alkoxysilyl chain terminations in Component }(A)}$$

Component (A) comprises polymers comprising on average at least 1.2 alkoxysilyl chain terminations per molecule described by the formula (VII). The polymers may be linear or branched and may be homopolymers, copolymers, or terpolymers. The polymers may be a single species or a mixture of different polymers so long as the polymers comprise on average at least 1.2 alkoxysilyl chain terminations per molecule.

The repeating units of the polymers of Component (A) may include organic units, such as oxyalkylene units, or preferably siloxy units such as described by $R^9_s\text{SiO}_{(4-s)/2}$, where each $R^9$ is independently selected from the group consisting of alkyl groups comprising 1 to about 6 carbon atoms, phenyl, and fluorinated alkyl groups, and s is 0, 1, or 2. Examples of the alkyl groups described by $R^9$ include methyl, ethyl, propyl, butyl and hexyl. An example of the fluorinated alkyl groups described by $R^9$ includes 3,3,3-trifluoropropyl. The preferred polymers of Component (A) comprise polydiorganosiloxanes having repeating units described by —$(R^9_s\text{SiO}_{(4-s)/2})_f$—, where each $R^9$ is methyl, s is 2, and f is a value such that Component (A) has a viscosity within a range of about 0.5 to 3000 Pa.s at 25° C. and preferably within a range of about 5 to 150 Pa.s at 25° C.

The polymers of Component (A) comprise on average at least 1.2 alkoxysilyl chain terminations per molecule described by formula (VII), i.e. —$\text{SiR}^1_x(\text{OR})_{3-x}$, where R, $R^1$, and x are as defined above. In preferred embodiments, each R is independently selected from the group consisting of methyl and ethyl, and x is 0.

In more preferred embodiments, a spacer group Z is bonded to the silicon atom of the alkoxysilyl chain termination, where each Z is independently selected from the group consisting of divalent hydrocarbon radicals free of aliphatic unsaturation comprising about 2 to 18 carbon atoms and a combination of divalent hydrocarbon radicals and siloxane segments described by formula

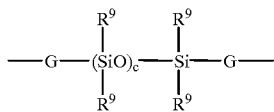

where $R^9$ is as defined above, each G is a divalent hydrocarbon radical free of aliphatic unsaturation comprising about 2 to 18 carbon atoms, and c is a whole number from 1 to about 6. Examples of the divalent hydrocarbon radicals describing Z and G include alkylene radicals such as ethylene, methylmethylene, propylene, butylene, pentylene, and hexylene; and arylene radicals including phenylene; with alkylenes being preferred, and in particular ethylene. In these preferred embodiments, each Z is preferably independently selected from alkylene radicals or a combination of divalent hydrocarbon radicals and siloxane segments, as described above, where each G is an alkylene, preferably, ethylene; each $R^9$ is methyl; and c is 1. More preferably each Z is an alkylene radical with ethylene being most preferred.

The polymers of Component (A) are required to have on average at least 1.2 alkoxysilyl chain terminations per molecule, and preferably, the polymers of Component (A) comprise on average at least 1.5 alkoxysilyl chain terminations per molecule. Since the polymers of Component (A) are required to have on average at least 1.2 alkoxysilyl chain terminations per molecule, some polymers may contain other types of chain terminations. Preferably, this other type of chain termination comprises organosilyl chain terminations selected from the group consisting of $CH_2$=CH—$SiR^9_2$— and $R^6_3$—Si—, where $R^9$ is as defined above and each $R^6$ is independently selected from the group consisting of methyl, ethyl, and vinyl. Examples of organosilyl chain terminations include trimethylsilyl, triethylsilyl, vinyldimethylsilyl, and vinylmethylphenylsilyl.

The polydiorganosiloxanes useful in this invention, as well as crosslinkers, fillers, and other optional ingredients useful in alkoxy-functional RTV silicone sealant compositions are well known in the art and are illustrated by Ceyzeriat et al., U.S. Pat. No. 3,151,099; Brown et al., U.S. Pat. No. 3,161,614; Weyenberg, U.S. Pat. No. 3,175,993 an: U.S. Pat. No. 3,334,067; Klosowski et al., U.S. Pat. No. 4,871,827; Kamis et al., U.S. Pat. No. 4,898,910; and Chu et al., U.S. Pat. No. 4,956,435; all of which are hereby incorporated by reference to show alkoxy-functional RTV silicone sealant ingredients and methods of preparing alkoxy-functional RTV silicone sealant compositions.

Polydiorganosiloxanes within the scope of Component (A), are exemplified by the disclosures of Brown et al., U.S. Pat. No. 3,161,614, and are described, for example, by formula (I)

(I)

and by mixtures of the polydiorganosiloxanes described by formula (I) and polydiorganosiloxanes described, for example, by formula (II)

(II)

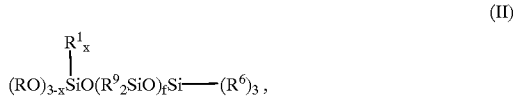

where R, $R^1$, $R^6$, $R^9$, x, and f are as defined above.

Preferred polydiorganosiloxanes within the scope of Component (A), include those described by Weyenberg, U.S. Pat. No. 3,175,993 and Klosowski et al., U.S. Pat. No. 4,871,827, which are hereby incorporated by reference, and can be described, for example, by formula (III)

(III)

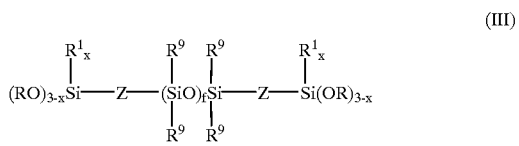

where R, $R^1$, $R^9$, Z, x, and f are as described above.

Other preferred Component (A) polymers useful in this invention are mixtures of the polydiorganosiloxanes described by formula (III) and polydiorganosiloxanes described by Kamis et al., U.S. Pat. No. 4,898,910, which is hereby incorporated by reference, and described, for example, by formula (IV)

(IV)

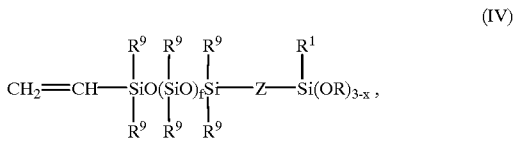

where R, $R^1$, $R^9$, Z, x and f are as defined above.

When Component (A) comprises mixtures of polydiorganosiloxanes described by formulas (III) and (IV), typically the polydiorganosiloxane described by formula (IV) will be present in an amount such that 40 percent or less of the chain terminations of Component (A) will be organosilyl chain terminations, and preferably in an amount such that less than 25 percent of the chain terminations of Component (A) are organosilyl chain terminations.

The most preferred Component (A) polymers useful in this invention are those polymers described by formula (III).

Component (A) also includes organic polymers comprising on average at least 1.2 alkoxysilyl chain terminations per molecule described by formula (VII), ie. —$SiR^1_x(OR)_{3-x}$, where R, $R^1$, and x are as defined above. The organic polymers within the scope of Component (A) may also comprise a spacer group —Z— bonded to the silicon atom of the alkoxysilyl chain termination, where Z is as defined above. One type of organic polymer useful in the invention is the polyoxyalkylene, described by Okawa et al., U.S. Pat. No. 5,403,881, and hereby incorporated by reference to show polyoxyalkylene polymers comprising on average at least 1.2 alkoxysilyl chain terminations per molecule described by formula (VII) and methods of preparing these polymers.

The amount of Component (A) useful in the present alkoxy-functional RTV compositions is dependent on the amounts of other components added so that molar ratios (I) and (II) as described below are met. Typically, however, Component (A) is added in amounts from about 30 to 85 weight percent based on the total weight of the alkoxy-functional RTV composition. Preferably, Component (A) is added in amounts from about 40 to 65 weight percent on the same basis.

The present alkoxy-functional RTV compositions also comprise a tetraalkoxytitanium compound (B) described by average formula (V), i.e. $Ti(OR^2)_y(OR^3)_{4-y}$, where each $R^2$ is independently selected from the group consisting of tertiary alkyl radicals and 2,4-dimethyl-3-pentyl; each $R^3$ is an independently selected alkyl radical comprising from 1 to about 6 carbon atoms; and y is an average value of from 3 to 4.

Examples of tertiary alkyl radicals represented by $R^2$ include tertiary butyl and tertiary amyl. Preferably, each $R^2$ is an independently selected tertiary alkyl radical. More preferably each $R^2$ is independently selected from the group consisting of a tertiary butyl radical and a tertiary amyl radical.

Examples of alkyl radicals comprising from 1 to about 6 carbon atoms represented by $R^3$ include methyl, ethyl, n-propyl, isopropyl, n-butyl, sec-butyl, and hexyl.

In formula (VI), y is an average value of from 3 to 4. Preferably, y is an average value of from about 3.4 to 4, with an average value from about 3.6 to 4 being most preferred.

The amount of Component (B) useful in the present alkoxy-functional RTV compositions is dependent on the amounts of other components added so that molar ratios (I) and (II) as described below are met. Typically, however, Component (B) is added in amounts in the range of about 0.1 to 5 weight percent based on the total weight of the alkoxy-functional RTV composition. Preferably, Component (B) is added in amounts in the range of about 0.5 to 3.0 weight percent on the same basis. The tetraalkoxytitanium compound may be a single species or a mixture of two or more species.

The present alkoxy-functional RTV compositions also comprise a filler (C) having hydroxyl content derived from covalently bonded hydroxyl groups, adsorbed water, or both covalently bonded hydroxyl groups and adsorbed water.

The term "covalently bonded hydroxyl groups" as defined herein, means those hydroxyl groups covalently bonded to the filler which are available for reaction. The term "adsorbed water", as defined herein, means associated water on the filler surface available for reaction and water from within the filler which becomes available for reaction.

A particular filler may only have adsorbed water and may not have any covalently bonded hydroxyl groups. However, many fillers have both covalently bonded hydroxyl groups and adsorbed water, for example, untreated fumed silica filler. The hydroxyl content of a filler can be altered by drying the filler and/or pretreating the filler with hydrophobing agents such as hexamethyldisilazane.

The filler can be selected from those known to be useful in alkoxy-functional RTV sealants. The fillers include ground, precipitated, and colloidal calcium carbonates which are untreated or treated with stearate or stearic acid; reinforcing silicas such as fumed silicas, precipitated silicas, and hydrophobed silicas; crushed quartz, ground quartz, alumina, aluminum hydroxide, titanium dioxide, diatomaceous earth, iron oxide, carbon black, and graphite. Silica and calcium carbonate are especially useful and blends of fumed silica and treated ground calcium carbonate are preferred.

The amount of filler useful in the alkoxy-functional RTV compositions generally is that amount of filler which provides the desired properties to the uncured composition such as viscosity, thixotropy, pigmentation, and UV protection. The amount of filler also depends upon the cured physical properties desired such as tensile strength, elongation, and durometer.

The amount of filler useful in the present alkoxy-functional RTV compositions is dependent not only on the above but also on the amounts of other components added, as well as the hydroxyl content of the specific filler used, so that molar ratios (I) and (II) as described below are met. Typically, however, the filler is added in amounts in the range of about 5 to 70 weight percent based on the total weight of the alkoxy-functional RTV composition. Preferably, the filler is added in amounts from about 20 to 60 weight percent on the same basis. The filler may be a single species or a mixture of two or more species.

The present alkoxy-functional RTV compositions also comprise an alkoxysilane (D) described by formula (VI), i.e. $R^4_z Si(OR^5)_{4-z}$, where each $R^4$ is independently selected from the group consisting of alkyl radicals comprising from 1 to about 12 carbon atoms and alkenyl radicals comprising from 1 to about 12 carbon atoms; each $R^5$ is independently selected from the group consisting of methyl and ethyl, and z is 1 or 2.

The alkyl radicals comprising 1 to about 12 carbon atoms represented by $R^4$ include for example methyl, ethyl, isobutyl, hexyl, octyl, and dodecyl.; The alkenyl radicals comprising 1 to about 12 carbon atoms represented by $R^4$ include for example vinyl, allyl, and butadienyl. Preferably, each $R^4$ is independently selected from the group consisting of methyl, ethyl, isobutyl and vinyl. More preferably each $R^4$ is methyl.

In formula (VI) subscript z can be 1 or 2. Preferably z is 1.

Examples of useful alkoxysilanes include methyltrimethoxysilane, methyltriethoxysilane, vinyltrimethoxysilane, vinyltriethoxysilane, ethyltrimethoxysilane, octyltriethoxysilane, dimethyldimethoxysilane, vinylmethyldimethoxysilane, dimethyldiethoxysilane, isobutyltrimethoxysilane, and ethylmethyldiethoxysilane. The partial hydrolyzates of these alkoxysilanes can also be used in the present composition. Preferred alkoxysilanes include methyltrimethoxysilane and dimethyldimethoxysilane.

The amount of alkoxysilane useful in the present alkoxy-functional RTV compositions is dependent on the amounts of other components added so that molar ratios (I) and (II) as described below are met. Typically, however, the alkoxysilane is added in amounts in the range of about 0.1 to 10 weight percent based on the total weight of the alkoxy-functional RTV composition, with amounts in the range of about 0.1 to 3 weight percent on the same basis being preferred. The alkoxysilane may be a single species or a mixture of two or more species.

Molar ratio (I) is defined herein as the sum of the moles of tetraalkoxytitanium compound (Component (B)) plus the moles of alkoxysilane (Component (D)) divided by the moles of hydroxyl content in the filler (Component(C)). When the present alkoxy-functional RTV compositions have a molar ratio (I) of at least 0.9 improved storage stability is obtained. For preferred embodiments, molar ratio (I) is in the range of about 0.9 to 5, and more preferably molar ratio (I) is in the range of about 1 to 3. Although improved storage stability is obtained when molar ratio (I) is above 5, other considerations make these compositions less desirable. For example, since both the alkoxysilane and the tetraalkoxytitanium compound are in the numerator of molar ratio (I), having a ratio greater than 5 could mean increasing one or both of those components. However increased amounts of alkoxysilane may decrease the rate of cure and increased amounts of the tetraalkoxytitanium compound adds cost to the composition and reduces the hydrolytic stability. The hydroxyl content in the filler could also be reduced to decrease the denominator of molar ratio (I), however, it is impractical to reduce the hydroxyl content of the filler below a certain level.

Molar ratio (II) is defined herein as the moles of tetraalkoxytitanium compound (Component (B)) divided by the sum of the moles of alkoxysilane (Component (D)) plus the moles of alkoxysilyl chain terminations in the polymers (Component (A)). When the present alkoxy-functional RTV compositions have a molar ratio (II) of at least 0.15, improved tack-free-times are obtained and the alkoxy-functional RTV compositions is fast curing. For preferred embodiments, molar ratio (II) is in a range between about 0.2 and 0.6, and more preferably molar ratio (II) is in a range between about 0.3 and 0.595. Although the alkoxy-functional RTV compositions are fast curing when molar ratio (II) is 0.6 or above, other considerations make these compositions less desirable. For example, increased amounts of the tetraalkoxytitanium compound adds cost to the composition and reduces the hydrolytic stability. In addition, the composition becomes so fast curing when molar ratio (II) is 0.6 or above that working time after application of the composition is very limited, potentially requiring the use of automated robotic equipment.

Other ingredients which are conventionally used in alkoxy-functional RTV compositions such as adhesion promoters, rheology additives, fungicides, colorants, pigments, and plasticizers, can be added as long as they do not interfere with the curability of the alkoxy-functional RTV compositions, either initially or upon storage, or reduce other desired properties.

Where organofunctional trialkoxysilanes are used as adhesion promoters and their amounts are such that the moles of organofunctional trialkoxysilane may be significant with respect to the moles of alkoxysilane added, it may be desirable to include the moles of such adhesion promoter as part of the moles of alkoxysilane in determining molar ratios (I) and (II).

The alkoxy-functional RTV compositions of this invention are fast curing. These results occur when the alkoxy-functional RTV compositions comprises a tetraalkoxytitanium compound described by formula (V) and molar ratios (I) and (II) are met.

This invention is further illustrated by the following examples which are presented for that purpose and are not intended to limit the scope of the claims herein. In the examples, "part" or "parts" refer to part by weight or parts by weight (expressed as "pbw") and viscosities were measured at 25° C. Me represents methyl, Et represents ethyl, AS chain term. represents alkoxysilyl chain terminations, Ot-Am represents tertiary-amyloxy, Ot-Bu represents tertiary-butoxy, OnBu represents normal butoxy, and OiPr represents isopropoxy.

Ingredients Used in the Examples

POLYMER=a polydimethylsiloxane described by the formula

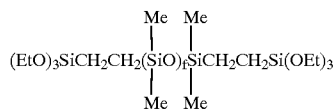

where f had an average value such that the polymer viscosity was 20 Pa.s

TITANIUM 1=a mixture of titanium molecules having an average formula $Ti(Ot-Bu)_{3.6}(OiPr)_{0.4}$
TITANIUM 2=$Ti(OiPr)_4$
TITANIUM 3=a mixture of titanium molecules having an average formula $Ti(OnBu)_{3.72}(OiPr)_{0.28}$
TITANIUM 4=a mixture of titanium molecules having an average formula $Ti(Ot-Am)_{3.92}(OiPr)_{0.08}$
ALKOXYSILANE 1=methyltrimethoxysilane
ALKOXYSILANE 2=dimethyldimethoxysilane
SILICA FILLER=fumed silica filler having a surface area of 150 $m^2/g$ and an adsorbed water content of 0.6 weight percent.

GRD $CaCO_3$=a ground calcium carbonate having an average particle size of 2–3 micrometers, surface treated with stearic acid, and having an adsorbed water content of 0.05 weight percent.

PPT $CaCO_3$=a precipitated calcium carbonate having a surface area of approximately 22 $m^2/g$, surface treated with stearic acid and having an adsorbed water content of 0.4 weight percent.

Skin Over Time (SOT)

The skin over time is defined as the time required for a curing material to form a non-tacky surface film upon exposure to atmospheric conditions of 25° C. and 50% relative humidity. The skin over time is measured by touching the surface of the material with the fingertip and slowly drawing it away. The skin over time is reached when the sample no longer adheres to the fingertip. Skin over time is reported in minutes.

Tack Free Time (TFT)

The tack free time also is defined as the time required for a non-tacky surface film to form but this test uses polyethylene film contact to determine the non-tacky characteristic. A clean polyethylene strip is applied to the sample surface with light fingertip pressure. The strip is then removed by gently pulling straight up from one end. The tack free time is reached when the strip pulls cleanly from the sample. This test is performed at atmospheric conditions of 25° C. and 50% relative humidity. Tack free time is reported in minutes.

EXAMPLES 1–4

Four alkoxy-functional RTV sealant compositions were each prepared, under conditions to exclude moisture, using the ingredients described in Table 1. The compositions were prepared by first adding alkoxysilane and titanium compound to the polymer, mixing, adding filler, mixing, and drawing a vacuum to remove incorporated air. The moles of groups and ingredients were based on 100 grams of the RTV sealant composition and appear in Table 1 in parenthesis below the weight parts. Molar ratios (I) and (II) as defined in this specification, were determined using the provided mole values. The alkoxy-functional RTV sealant compositions were stored in containers sealed to prevent atmospheric moisture from entering. Initial testing was done after seven days storage at 25° C. Samples were then aged at 50° C. for an additional seven days prior to retesting. Cure times were tested as described above and the results are provided in Table 1. Examples 1 and 4 show improved SOT and TFT both initially and after storage at 1 week/50° C. using Titanium 1 and Titanium 4 respectively, as compared to the SOT and TFT results obtained using Titanium 2 and Titanium 3 which are both outside the scope of the present invention.

TABLE I

Use of Different Tetraalkoxytitanium Compounds

| INGREDIENT | 1 | 2* | 3* | 4 |
|---|---|---|---|---|
| POLYMER, pbw | 48.00 | 48.17 | 48.00 | 47.84 |
| (moles AS chain term.) | (0.00200) | (0.00201) | (0.00200) | (0.00199) |
| TITANIUM 1, pbw | 1.00 | 0.00 | 0.00 | 0.00 |
| (moles titanium) | (0.00294) | (0.00) | (0.00) | (0.00) |
| TITANIUM 2, pbw | 0.00 | 0.83 | 0.00 | 0.00 |
| (moles titanium) | (0.00) | (0.00292) | (0.00) | (0.00) |
| TITANIUM 3, pbw | 0.00 | 0.00 | 1.00 | 0.00 |
| (moles titanium) | (0.00) | (0.00) | (0.00294) | (0.00) |
| TITANIUM 4, pbw | 0.00 | 0.00 | 0.00 | 1.16 |
| (moles titanium) | (0.00) | (0.00) | (0.00) | (0.00293) |

TABLE I-continued

Use of Different Tetraalkoxytitanium Compounds

| INGREDIENT | EXAMPLE | | | |
|---|---|---|---|---|
| | 1 | 2* | 3* | 4 |
| ALKOXYSILANE 1, pbw | 1.00 | 1.00 | 1.00 | 1.00 |
| (moles silane) | (0.00735) | (0.00735) | (0.00735) | (0.00735) |
| SILICA FILLER, pbw | 5.00 | 5.00 | 5.00 | 5.00 |
| (moles OH) | (0.00333) | (0.00333) | (0.00333) | (0.00333) |
| GRD CaCO$_3$, pbw | 45.00 | 45.00 | 45.00 | 45.00 |
| (moles OH) | (0.00250) | (0.00250) | (0.00250) | (0.00250) |
| MOLAR RATIO (I) | 1.76 | 1.76** | 1.76** | 1.76 |
| MOLAR RATIO (II) | .31 | 0.31** | 0.31** | 0.31 |
| SOT, minutes | | | | |
| Initial | 23.50 | 40.00 | 64.50 | 17.50 |
| 1 week/50° C. aging | 12.00 | 36.00 | 37.00 | 8.00 |
| TFT, minutes | | | | |
| Initial | 36.50 | 72.00 | >95.00 | 24.50 |
| 1 week/50° C. aging | 20.00 | 83.00 | 97.00 | 11.50 |

*Comparative Example
**These values for molar ratio (I) and molar ratio (II) include moles of Titanium 2 and Titanium 3 which were not within the scope of the titanium compound of the present invention.

EXAMPLE 5–9

RTV sealant compositions containing Titanium 1 were prepared and tested in the same manner as Examples 1–4. The ingredients, their amounts, and the properties measured are provided in Table 2. Comparative Examples 5 and 7 show the criticality of the lower end of molar ratios (I) and (II) for fast curing compositions and storage stable compositions.

TABLE 2

Compositions Containing Titanium 1 at Varying Molar Ratios

| INGREDIENT | EXAMPLE | | | | | |
|---|---|---|---|---|---|---|
| | 1 | 5* | 6 | 7* | 8 | 9 |
| POLYMER, pbw | 48.00 | 49.35 | 44.50 | 48.35 | 47.65 | 47.50 |
| (moles AS chain term.) | (0.00200) | (0.00206) | (0.00185) | (0.00201) | (0.00199) | (0.00198) |
| TITANIUM 1, pbw | 1.00 | 0.40 | 2.50 | 0.40 | 1.55 | 1.85 |
| (moles titanium) | (0.00294) | (0.00118) | (0.00735) | (0.00118) | (0.00456) | (0.00544) |
| ALKOXYSILANE 1, pbw | 1.00 | 0.25 | 3.00 | 1.25 | 0.80 | 0.65 |
| (moles silane) | (0.00735) | (0.00184) | (0.0221) | (0.00919) | (0.00588) | (0.00478) |
| SILICA FILLER, pbw | 5.00 | 5.00 | 5.00 | 5.00 | 5.00 | 5.00 |
| (moles OH) | (0.00333) | (0.00333) | (0.00333) | (0.00333) | (0.00333) | (0.00333) |
| GRD CaCO$_3$, pbw | 45.00 | 45.00 | 45.00 | 45.00 | 45.00 | 45.00 |
| (moles OH) | (0.00250) | (0.00250) | (0.00250) | (0.00250) | (0.00250) | (0.00250) |
| MOLAR RATIO (I) | 1.76 | 0.52 | 5.04 | 1.78 | 1.79 | 1.75 |
| MOLAR RATIO (II) | 0.31 | 0.30 | 0.31 | 0.10 | 0.58 | 0.81 |
| SOT, minutes | | | | | | |
| Initial | 23.50 | 3.00 | 1.50 | 48.00 | 3.00 | 1.50 |
| 1 week/50° C. aging | 12.00 | Cured in tube | 2.50 | 30.50 | 2.00 | 1.00 |
| TFT, minutes | | | | | | |
| Initial | 36.50 | 9.50 | 7.50 | 71.00 | 8.00 | 2.50 |
| 1 week/50° C. aging | 20.00 | Cured in tube | 6.00 | 66.50 | 6.00 | 1.50 |

*Comparative Example

EXAMPLE 10–11

RTV sealant compositions containing Titanium 4 were prepared and tested in the same manner as Examples 1–4. The ingredients, their amounts, and the properties measured are provided in Table 3. Comparative Example 10 shows the criticality of the lower end of molar ratio (II) for fast curing compositions.

TABLE 3

Compositions Containing Titanium 4 at Varying Molar Ratios

| INGREDIENT | EXAMPLE | | |
|---|---|---|---|
| | 4 | 10* | 11 |
| POLYMER, pbw | 47.84 | 48.28 | 47.40 |
| (moles AS chain term.) | (0.00199) | (00.00201) | (0.00198) |
| TITANIUM 4, pbw | 1.16 | 0.47 | 1.80 |
| (moles titanium) | (0.00293) | (0.00119) | (0.00455) |
| ALKOXYSILANE 1, pbw | 1.00 | 1.25 | 0.80 |
| (moles silane) | (0.00735) | (0.00919) | (0.00588) |
| SILICA FILLER, pbw | 5.00 | 5.00 | 5.00 |
| (moles OH) | (0.00333) | (0.00333) | (0.00333) |
| GRD CaCO$_3$, pbw | 45.00 | 45.00 | 45.00 |
| (moles OH) | (0.00250) | (0.00250) | (0.00250) |
| MOLAR RATIO (I) | 1.76 | 1.78 | 1.79 |
| MOLAR RATIO (II) | 0.31 | 0.11 | 0.58 |
| SOT, minutes | | | |
| Initial | 17.50 | 62.00 | 1.50 |
| 1 week/50° C. aging | 8.00 | 44.50 | 0.50 |
| TFT, minutes | | | |
| Initial | 24.50 | 75.00 | 3.50 |
| 1 week/50° C. aging | 11.50 | 60.00 | 2.00 |

*Comparative Example

EXAMPLE 12–15

RTV sealant compositions were prepared and tested in the same manner as Examples 1–4. The ingredients, their amounts, and the properties measured are provided in Table 4. Example 14 shows improved cure rate using a different filler. Comparative Examples 12 and 13 show the criticality of the lower end of molar ratios (I) and (II) on cure rate using this different filler. Example 15 demonstrates that fast curing compositions may be obtained using an alkoxysilane having 2 alkoxy groups.

TABLE 4

Effect of Alternate Filler or Alkoxysilane

| | EXAMPLE | | | | |
|---|---|---|---|---|---|
| INGREDIENT | 1 | 12* | 13* | 14 | 15 |
| POLYMER, pbw | 48.00 | 63.00 | 60.70 | 59.75 | 47.68 |
| (moles AS chain term.) | (0.00200) | (0.00263) | (0.00253) | (0.00249) | (0.00199) |
| TITANIUM 1, pbw | 1.00 | 1.00 | 1.00 | 2.50 | 1.00 |
| (moles titanium) | (0.00294) | (0.00294) | (0.00294) | (0.00735) | (0.00294) |
| ALKOXYSILANE 1, pbw | 1.00 | 1.00 | 3.30 | 2.75 | 0.00 |
| (moles silane) | (0.00735) | (0.00735) | (0.0243) | (0.0202) | (0.00) |
| ALKOXYSILANE 2, pbw | 0.00 | 0.00 | 0.00 | 0.00 | 1.32 |
| (moles silane) | (0.00) | (0.00) | (0.00) | (0.00) | (0.0110) |
| SILICA FILLER, pbw | 5.00 | 0.00 | 0.00 | 0.00 | 5.00 |
| (moles OH) | (0.00333) | (0.00) | (0.00) | (0.00) | (0.00333) |
| GRD CaCO$_3$, pbw | 45.00 | 0.00 | 0.00 | 0.00 | 45.00 |
| (moles OH) | (0.00250) | (0.00) | (0.00) | (0.00) | (0.00250) |
| PPT CaCO$_3$, pbw | 0.00 | 35.00 | 35.00 | 35.00 | 0.00 |
| (moles OH) | (0.00) | (0.0156) | (0.0156) | (0.0156) | (0.00) |
| MOLAR RATIO (I) | 1.76 | 0.66 | 1.75 | 1.77 | 2.39 |
| MOLAR RATIO (II) | 0.31 | 0.29 | 0.11 | 0.32 | 0.23 |
| SOT, minutes | | | | | |
| Initial | 23.50 | 25.00 | 19.50 | 5.00 | 5.00 |
| 1 week/50° C. aging | 12.00 | 29.25 | 25.00 | 9.00 | 4.50 |
| TFT, minutes | | | | | |
| Initial | 36.50 | 55.00 | 49.50 | 11.00 | 8.75 |
| 1 week/50° C. aging | 20.00 | 56.25 | 76.00 | 21.00 | 7.00 |

*Comparative Example

We claim:

1. A moisture curing alkoxy-functional RTV composition comprising (A) polymers comprising on average at least 1.2 alkoxysilyl chain terminations per molecule described by formula $$—SiR^1{}_x(OR)_{3-x},\qquad (VII)$$

where each R is independently selected from the group consisting of methyl, ethyl, n-propyl, isopropyl, n-butyl, sec-butyl, and isobutyl, $R^1$ is selected from the group consisting of methyl and ethyl, and x is 0 or 1;

(B) a tetraalkoxytitanium compound described by average formula $$Ti(OR^2)_y(OR^3)_{4-y},\qquad (V)$$

where each $R^2$ is independently selected from the group consisting of tertiary alkyl radicals and 2,4-dimethyl-3-pentyl; each $R^3$ is an independently selected alkyl radical comprising from 1 to about 6 carbon atoms; and y is an average value of from 3 to 4;

(C) a filler having hydroxyl content derived from covalently bonded hydroxyl groups, adsorbed water, or both covalently bonded hydroxyl groups and adsorbed water; and (D) an alkoxysilane described by formula $$R^4{}_zSi(OR^5)_{4-z},\qquad (VI)$$

where each $R^4$ is independently selected from the group consisting of alkyl radicals comprising from 1 to about 12 carbon atoms and alkenyl radicals comprising from 1 to about 12 carbon atoms, each $R^5$ is independently selected from the group consisting of methyl and ethyl, and z is 1 or 2; with the proviso that components (A), (B), (C), and (D) are added in amounts such that a molar ratio (I) is at least 0.9 and a molar ratio (II) is at least 0.15, where molar ratio (I) = 

$$\text{molar ratio (I)} = \frac{\text{moles Component }(B) + \text{moles Component }(D)}{\text{moles hydroxyl in Component }(C)}$$

and molar ratio (II) = 

$$\text{molar ratio (II)} = \frac{\text{moles Component }(B)}{\text{moles Component }(D) + \text{moles alkoxysilyl chain terminations in Component }(A)}$$

2. The alkoxy-functional RTV composition according to claim 1, where each $R^2$ is an independently selected tertiary alkyl radical, molar ratio (I) is in a range of about 0.9 to 5 and molar ratio (II) is in a range between about 0.2 and 0.6.

3. The alkoxy-functional RTV composition according to claim 1, where molar ratio (I) is in a range of about 1 to 3 and molar ratio (II) is in a range between about 0.3 and 0.595.

4. The alkoxy-functional RTV composition according to claim 1, where each $R^2$ is an independently selected tertiary alkyl radical.

5. The alkoxy-functional RTV composition according to claim 2, where each $R^2$ is independently selected from the group consisting of a tertiary butyl radical and a tertiary amyl radical.

6. The alkoxy-functional RTV composition according to claim 2, where each $R^2$ is independently selected from the group consisting of a tertiary butyl radical and a tertiary amyl radical and y is an average value of from about 3.4 to 4.

7. The alkoxy-functional RTV composition according to claim 2 where each $R^2$ is independently selected from the group consisting of a tertiary butyl radical and a tertiary amyl radical and y is an average value of from about 3.6 to 4.

8. The alkoxy-functional RTV composition according to claim 3 where each $R^2$ is independently selected from the group consisting of a tertiary butyl radical and a tertiary amyl radical and y is an average value of from about 3.6 to 4.

9. The alkoxy-functional RTV composition according to claim 2, where Component (A) comprises a polydiorganosiloxane described by formula (I)

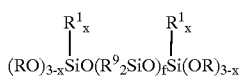
(I)

or a mixture of the polydiorganosiloxane described by formula (I) and a polydiorganosiloxane described by formula (II)

(II)

where each $R^6$ is independently selected from the group consisting of methyl, ethyl, and vinyl; each $R^9$ is independently selected from the group consisting of alkyl groups comprising 1 to about 6 carbon atoms, phenyl, and fluorinated alkyl groups; and f is a value such that Component (A) has a viscosity within a range of about 0.5 to 3000 Pa.s at 25° C.

10. The alkoxy-functional RTV composition according to claim 6, where Component (A) comprises a polydiorganosiloxane described by formula (I)

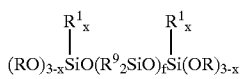
(I)

or a mixture of the polydiorganosiloxane described by formula (I) and a polydiorganosiloxane described by formula (II)

(II)

where each R is independently selected from the group consisting of methyl and ethyl; each $R^6$ is independently selected from the group consisting of methyl, ethyl, and vinyl; each $R^9$ is independently selected from the group consisting of alkyl groups comprising 1 to about 6 carbon atoms, phenyl, and fluorinated alkyl groups; and f is a value such that Component (A) has a viscosity within a range of about 5 to 150 Pa.s at 25° C.

11. The alkoxy-functional RTV composition according to claim 2, where Component (A) comprises a polydiorganosiloxane described by formula (III)

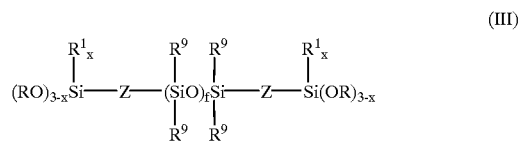
(III)

where each $R^9$ is independently selected from the group consisting of alkyl groups comprising 1 to about 6 carbon atoms, phenyl, and fluorinated alkyl groups; f is a value such that Component (A) has a viscosity within a range of about 0.5 to 3000 Pa.s at 25° C.; and each Z is independently selected from the group consisting of divalent hydrocarbon radicals free of aliphatic unsaturation comprising about 2 to 18 carbon atoms and a combination of divalent hydrocarbon radicals and siloxane segments described by formula

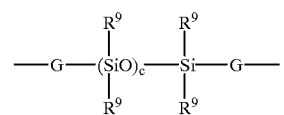

where $R^9$ is as defined above, each G is a divalent hydrocarbon radical free of aliphatic unsaturation comprising about 2 to 18 carbon atoms, and c is a whole number from 1 to about 6.

12. The alkoxy-functional RTV composition according to claim 5, where Component (A) comprises a polydiorganosiloxane described by formula (III)

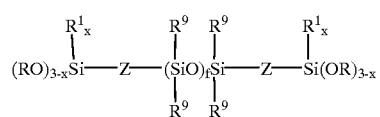
(III)

where each $R^9$ is independently selected from the group consisting of alkyl groups comprising 1 to about 6 carbon atoms, phenyl, and fluorinated alkyl groups; f is a value such that Component (A) has a viscosity within a range of about 0.5 to 3000 Pa.s at 25° C.; and each Z is independently selected from the group consisting of divalent hydrocarbon radicals free of aliphatic unsaturation comprising about 2 to 18 carbon atoms and a combination of divalent hydrocarbon radicals and siloxane segments described by formula

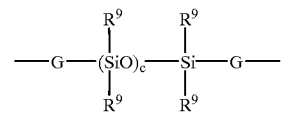

where $R^9$ is as defined above, each G is a divalent hydrocarbon radical free of aliphatic unsaturation comprising about 2 to 18 carbon atoms, and c is a whole number from 1 to about 6.

13. The alkoxy-functional RTV composition according to claim 6, where Component (A) comprises a polydiorganosiloxane described by formula (III)

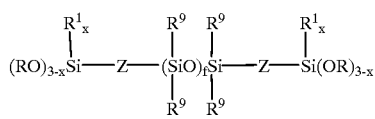
(III)

where each R and $R^9$ is independently selected from the group consisting of methyl and ethyl; f is a value such that Component (A) has a viscosity within a range of about 0.5 to 3000 Pa.s at 25° C.; x is 0 and each Z is an alkylene.

14. The alkoxy-functional RTV composition according to claim 8, where Component (A) comprises a polydiorganosiloxane described by formula (III)

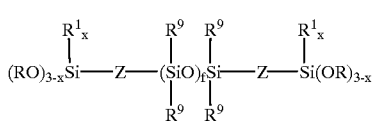
(III)

where each R is ethyl, each $R^9$ is independently selected from the group consisting of methyl and ethyl; f is a value such that Component (A) has a viscosity within a range of about 5 to 150 Pa.s at 25° C.; x is 0 and each Z is ethylene.

15. The alkoxy-functional RTV composition according to claim 2, where Component (A) comprises a polydiorganosiloxane described by formula (III)

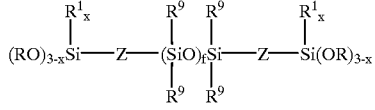
(III)

or a mixture of the polydiorganosiloxane described by formula (III) and a polydiorganosiloxane described by formula (IV)

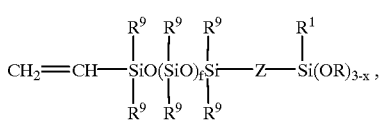
(IV)

where each $R^9$ is independently selected from the group consisting of alkyl groups comprising 1 to about 6 carbon atoms, phenyl, and fluorinated alkyl groups; f is a value such that Component (A) has a viscosity within a range of about 0.5 to 3000 Pa.s at 25° C.; and each Z is independently selected from the group consisting of divalent hydrocarbon radicals free of aliphatic unsaturation comprising about 2 to 18 carbon atoms and a combination of divalent hydrocarbon radicals and siloxane segments described by formula

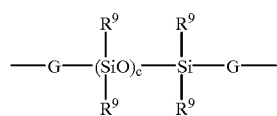

where $R^9$ is as defined above, each G is a divalent hydrocarbon radical free of aliphatic unsaturation comprising about 2 to 18 carbon atoms, and c is a whole number from 1 to about 6.

16. The alkoxy-functional RTV composition according to claim 5, where Component (A) comprises a polydiorganosiloxane described by formula (III)

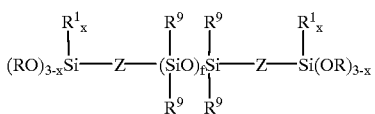
(III)

or a mixture of the polydiorganosiloxane described by formula (III) and a polydiorganosiloxane described by formula (IV)

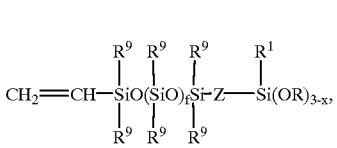
(IV)

where each R and $R^9$ is independently selected from the group consisting of methyl and ethyl; f is a value such that Component (A) has a viscosity within a range of about 0.5 to 3000 Pa.s at 25° C.; x is 0 and each Z is independently selected from the group consisting of alkylenes and

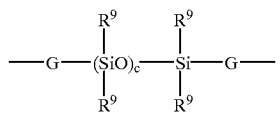

where each G is an alkylene and 40 percent or less of the chain terminations are organosilyl chain terminations described by $CH_2=CH-SiR^9_2$, where $R^9$ is as defined above.

17. The alkoxy-functional RTV composition according to claim 6, where Component (A) comprises a polydiorganosiloxane described by formula (III)

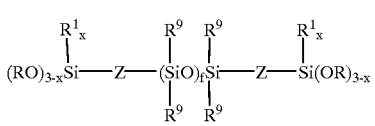
(III)

or a mixture of the polydiorganosiloxane described by formula (III) and a polydiorganosiloxane described by formula (IV)

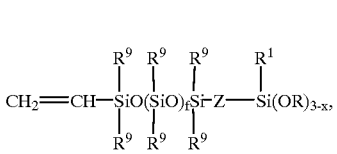
(IV)

where each R and $R^9$ is independently selected from the group consisting of methyl and ethyl; f is a value such that Component (A) has a viscosity within a range of about 5 to 150 Pa.s at 25° C.; x is 0 and each Z is described by formula

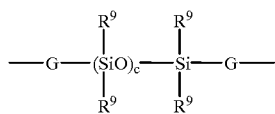

where each G is ethylene and 25 percent or less of the chain terminations are organosilyl chain terminations described by $CH_2=CH-SiR^9_2$, where $R^9$ is as defined above.

18. The alkoxy-functional RTV composition according to claim 14, where Component (C) is a blend of a fumed silica and a ground calcium carbonate.

19. The alkoxy-functional RTV composition according to claim 14, where Component (D) is methyltrimethoxysilane or dimethyldimethoxysilane.

20. A moisture curable alkoxy-functional RTV composition obtained by mixing components comprising
(A) polymers comprising on average at least 1.2 alkoxysilyl chain terminations per molecule described by formula $$-SiR^1_x(OR)_{3-x},\qquad (VII)$$

where each R is independently selected from the group consisting of methyl, ethyl, n-propyl, isopropyl, n-butyl, sec-butyl, and isobutyl, $R^1$ is selected from the group consisting of methyl and ethyl, and x is 0 or 1;
(B) a tetraalkoxytitanium compound described by average formula $$Ti(OR^2)_y(OR^3)_{4-y},\qquad (V)$$

where each $R^2$ is independently selected from the group consisting of tertiary alkyl radicals and 2,4-dimethyl-3-pentyl; each $R^3$ is an independently selected alkyl radical comprising from 1 to about 6 carbon atoms; and y is an average value of from 3 to 4;
(C) a filler having hydroxyl content derived from covalently bonded hydroxyl groups, adsorbed water, or both covalently bonded hydroxyl groups and adsorbed water; and (D) an alkoxysilane described by formula

where each $R^4$ is independently selected from the group consisting of alkyl radicals comprising from 1 to about 12 carbon atoms and alkenyl radicals comprising from 1 to about 12 carbon atoms, each $R^5$ is independently selected from the group consisting of methyl and ethyl, and z is 1 or 2; with the proviso that components (A), (B), (C), and (D) are added in amounts such that a molar ratio (I) is at least 0.9 and a molar ratio (II) is at least 0.15, where

and

21. The composition product according to claim 20, where molar ratio (I) is in the range of about 1 to 3, molar ratio (II) is in a range between about 0.3 and 0.595, and each $R^2$ is an independently selected tertiary alkyl radical.

22. A cured alkoxy-functional RTV composition obtained by exposing the alkoxy-functional RTV composition according to claim 2 to moisture.

23. The composition product according to claim 20, where molar ratio (I) is in a range of about 0.9 to 5, molar ratio (II) is in a range between about 0.15 and 0.6, and each $R^2$ is an independently selected tertiary alkyl radical.

* * * * *